(12) United States Patent
Chu et al.

(10) Patent No.: US 8,996,892 B1
(45) Date of Patent: Mar. 31, 2015

(54) POWER SMART PERIPHERAL DEVICES WITH EXTERNAL POWER SUPPLIES

(75) Inventors: Chee Hoe Chu, San Jose, CA (US); Ping Zheng, San Jose, CA (US); Wei Zhou, San Jose, CA (US); Po-Chien Chang, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 777 days.

(21) Appl. No.: 13/272,745

(22) Filed: Oct. 13, 2011

Related U.S. Application Data

(60) Provisional application No. 61/405,094, filed on Oct. 20, 2010.

(51) Int. Cl.
*G06F 1/00* (2006.01)
*G06F 1/32* (2006.01)

(52) U.S. Cl.
CPC ..................... *G06F 1/325* (2013.01)
USPC ........... 713/300; 713/320; 713/323; 713/324; 710/8; 710/62; 710/64

(58) Field of Classification Search
CPC ............. G06F 1/26; G06F 1/266; G06F 1/30; G06F 1/3203; G06F 1/3209; G06F 1/3215; G06F 1/3234; G06F 1/325; G06F 1/3278; G06F 1/3287
USPC ........... 713/300, 320, 323, 324; 710/8, 62, 64
See application file for complete search history.

(56) References Cited

U.S. PATENT DOCUMENTS

| | | | |
|---|---|---|---|
| 8,018,176 B1 * | 9/2011 | Small et al. .................... | 315/291 |
| 2001/0003205 A1 * | 6/2001 | Gilbert .......................... | 713/320 |
| 2009/0024855 A1 * | 1/2009 | Hsieh ........................... | 713/300 |

* cited by examiner

*Primary Examiner* — Michael J Brown

(57) ABSTRACT

A peripheral device includes a host interface, a power interface, a switch, a control module, and a regulator. The host interface transfers data between the peripheral device and a host. The power interface receives power from a power source. The power source is separate from the peripheral device and the host. The control module monitors the host interface and generates a control signal to transition the switch from a first state to a second state when the host interface does not receive an expected signal from the host. The regulator powers the control module and a circuit of the peripheral device based on the power received from the power source. The control module is separate from the circuit. The switch activates the control module, the regulator and the circuit when in the first state and deactivates the control module, the regulator and the circuit when in the second state.

21 Claims, 9 Drawing Sheets

POWER SMART PERIPHERAL DEVICES WITH EXTERNAL POWER SUPPLIES

CROSS-REFERENCE TO RELATED APPLICATIONS

This application claims the benefit of U.S. Provisional Application No. 61/405,094, filed on Oct. 20, 2010. The disclosure of the above application is incorporated herein by reference in its entirety.

FIELD

The present disclosure relates to peripheral devices, and more particularly to power control systems of peripheral devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Peripheral devices communicate with a host (e.g., a computer, a television, and a digital video recorder). Peripheral devices are separate from the host, typically operationally dependent upon the host, and supplement capabilities of the host. Examples of peripheral devices are a memory drive, a printer, a projector, etc. Peripheral devices include, for example, one or more control modules, hard disk drive(s), a printer mechanism, a projection lamp circuit, and a scanner lamp circuit.

A peripheral device typically includes a first power switch (sometimes referred to as a main power switch) for manual power ON and OFF of the peripheral device. The first power switch has a CLOSED (or ON) state and an OPEN (or OFF) state. The peripheral device is deactivated when the first power switch is transitioned to the OFF state. All components including control modules and peripheral circuits of the peripheral device are powered down when the peripheral device is deactivated. The peripheral device is deactivated without flushing volatile memory and/or cache of the peripheral device to non-volatile memory when the first switch is transitioned to the OFF state.

A peripheral device may also include a soft power switch having an OPEN and CLOSED state. The soft power switch is also manually operated and transitions the peripheral device between power ON and power OFF modes. In the power ON mode, the peripheral device is fully powered up and is in communication with the host. Components of the peripheral device including control modules and peripheral circuits are powered down when transitioning to the power OFF mode. The peripheral device transitions from the power ON mode to the power OFF mode when the soft power switch is transitioned from a CLOSED state to an OPEN state. The peripheral device flushes volatile memory and/or cache to non-volatile memory when transitioning from the power ON mode to the power OFF mode and the soft power switch is in the OPEN state.

In addition to having a power ON mode and a power OFF mode, peripheral devices may operate in a standby mode. For example, a storage device may be connected to a host and receive a standby request signal from the host. The storage device may power down certain high-power components, such as hard disk drive(s) to conserve energy. Other components, such as control modules and corresponding integrated circuits, regulators, cooling fans, etc. remain powered up.

A control module and corresponding integrated circuit of the storage device is maintained in a powered up state to receive communication signals from the host. This allows the host to reactivate the storage device from the standby mode to a fully powered up state (or power ON mode) when access to the storage device is needed. Because the control module is maintained in a powered up state, a regulator and cooling fan are also maintained in a powered up state. The regulator provides and regulates power to the control module and the cooling fan. The cooling fan maintains temperature of the storage device within a predetermined range.

SUMMARY

A peripheral device is provided and includes a host interface configured to receive and transmit data between the peripheral device and a host. A power interface is configured to receive power from a power source. The power source is separate from the peripheral device and the host. A switch has a first state and a second state. A control module is configured to monitor the host interface and generate a control signal to transition the switch to the second state when the host interface does not receive an expected signal from the host. At least one regulator is configured to power the control module and a circuit of the peripheral device based on the power received from the power source. The control module is separate from the circuit. The switch is configured to activate the control module, the at least one regulator and the circuit when in the first state and deactivate the control module, the at least one regulator and the circuit when in the second state.

In other features, the switch is configured to deactivate the peripheral device when in the second state. In other features, the circuit includes a hard disk drive, a print mechanism, a projector lamp circuit or a scanner lamp circuit. The switch is configured to deactivate the hard disk drive, the print mechanism, the projector lamp circuit or the scanner lamp circuit when in the second state.

In other features, the peripheral device further includes a storage device for storing the data. A second control module is configured to control transfer of the data between the host and the storage device. The switch is configured to deactivate the second control module when in the second state. In other features, the host interface is a universal serial bus interface. The second control module is a universal serial bus-to-serial advanced technology attachment converter. The storage device includes a hard disk drive.

In other features, the switch is a first switch. The peripheral device further includes a second switch configured to transition between a first position and a second position. The second switch is configured to activate the peripheral device when in the first position and deactivate the peripheral device when in the second position. The peripheral device is deactivated when the first switch is in the second state and the second switch is in the first position. The control module transitions from a power ON mode to a shutdown mode and then from the shutdown mode to a power OFF mode when the second switch transitions to the second position. The shutdown mode includes flushing data from a volatile memory to a non-volatile memory.

In other features, the control module is configured to: determine whether power is received from the host or there is communication activity between the host and the peripheral device; and wait a predetermined period prior to deactivating the peripheral device when power is not received from the host or there is not communication activity between the host and the peripheral device.

In other features, the switch is a first switch. The peripheral device further includes a second switch configured to activate the peripheral device when in a first position and transition the peripheral device to a shutdown mode when in a second position. The peripheral device is deactivated and in a power OFF mode when the first switch is in the second state and the second switch is in the first position or the second position. The peripheral device is in the power OFF mode when the first switch is in the first state and the second switch is transitioned to the second position.

In other features, the switch is a first switch. The peripheral device further includes a second switch configured to activate the peripheral device when in a first position and transition the peripheral device to a shutdown mode when in a second position. The first control module, when the second switch is in the second position, is configured to: initiate a timer; flush a volatile memory to a non-volatile memory; and deactivate the circuit.

In other features, the control module is configured to: deactivate the peripheral device when a predetermined period of the timer has lapsed; and refrain from deactivating the peripheral device prior to the predetermined period lapsing and when the second switch is transitioned to the first position. In other features, the timer is a first timer. The first control module, when a cable is not connected to the host and to the peripheral device, is configured to initiate a second timer, flush the volatile memory to the non-volatile memory, and deactivate the circuit.

In other features, the first control module is configured to: deactivate the peripheral device when a predetermined period of the second timer has lapsed; and refrain from deactivating the peripheral device prior to the predetermined period of the second timer lapsing and when the cable is connected to the host and to the peripheral device.

In other features, the timer is a first timer. The control module, when power is not received by the peripheral device from the host or there is not communication activity between the host and the peripheral device, is configured to initiate a second timer, flush the volatile memory to the non-volatile memory, and deactivate the circuit.

In other features, the control module is configured to: deactivate the peripheral device when a predetermined period of the second timer has lapsed; and activate the circuit prior to the predetermined period of the second timer lapsing and when power is received by the peripheral device from the host or there is communication activity between the host and the peripheral device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
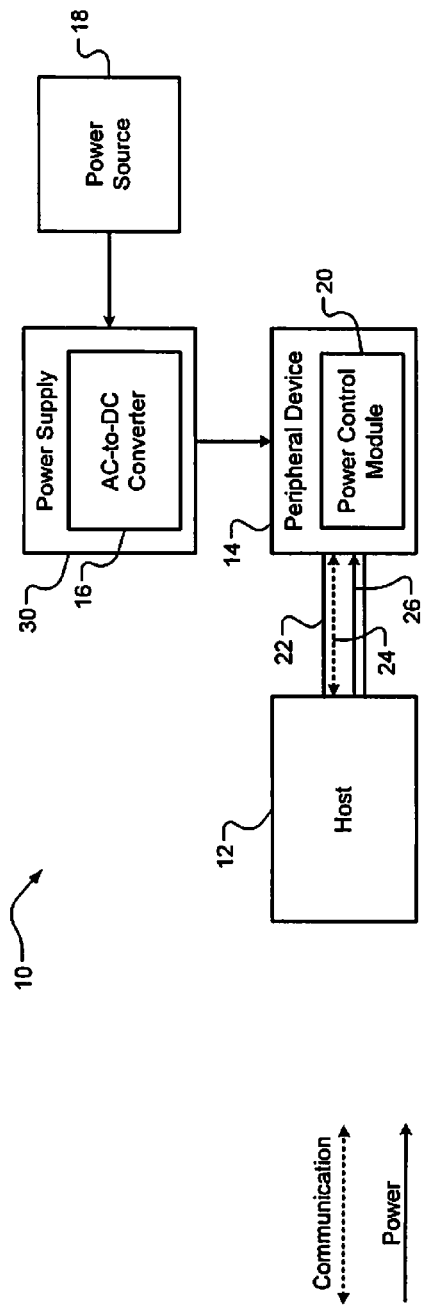
FIG. 1 is a functional block diagram of a peripheral system in accordance with the present disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Although the terms first, second, third, etc. may be used herein to describe various elements, components, devices, and/or conductors, these elements, components, devices, and/or conductors should not be limited by these terms. These terms may be only used to distinguish one element, component, device or conductor from another element, component, device or conductor. Terms such as "first," "second," and other numerical terms when used herein do not imply a sequence or order unless clearly indicated by the context. Thus, a first element, component, device or conductor discussed below could be termed a second element, component, device or conductor without departing from the teachings herein.

During a standby mode, certain components of peripheral devices typically remain powered. These components may include control modules and corresponding integrated circuits, power and/or voltage regulators, cooling fans, etc. For example, a storage drive may be used to supplement memory of a host, such as a digital video recorder (or media player) or personal computer. The host may request that the storage drive operate in a standby mode by transmitting a standby mode request signal to the storage drive. A control module, a voltage regulator and a cooling fan may remain ON when in the standby mode. Thus, power is consumed when a peripheral device is not being used by a host. In a corporation that has numerous peripheral devices, the collective amount of power consumed by these peripheral devices while in the standby mode is considerable.

Peripheral devices can also be left in a fully powered ON state when a standby mode request is not received. For example, a host may be powered down. The host may be powered down via a remote control device. The host may not transmit a standby mode request signal to a peripheral device connected to the host prior to the host being powered down. In this situation, the peripheral device remains in a fully powered ON state when not being accessed by the host, which results in additional energy being consumed.

The implementations disclosed herein minimize and/or prevent power consumption by a peripheral device when the peripheral device is not being accessed by a host.

In FIG. 1, a peripheral system 10 is shown. The peripheral system 10 includes a host 12, a peripheral device 14, an alternating current-to-direct current (AC-to-DC) converter 16, and a power source 18. The peripheral device 14 includes a power control module 20 that controls powering down the peripheral device 14. The power control module 20 deactivates the peripheral device 14 in response to: a standby mode request from the host 12; a connection between the host 12 and the peripheral device 14 being disconnected; and/or communication activity between the host 12 and the peripheral device 14 being ceased for a predetermined period of time. The host 12 is connected to the peripheral device 14 when a cable 22 is connected to both the host 12 and the peripheral device 14. Components of the peripheral device 14 may be powered down when the peripheral device 14 is deactivated. This includes powering down devices such as control modules, integrated circuits, hard disk drives (HDDs), printer mechanisms, projector lamp circuits, scanner lamp circuits, regulators, converters, cooling fans, etc.

Figure 2:
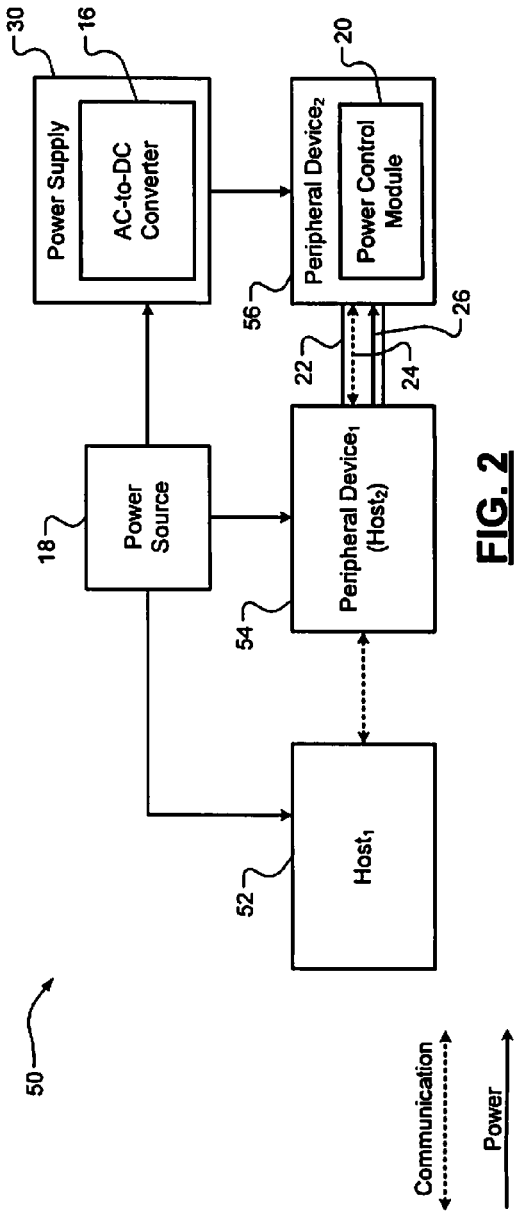
FIG. 2 is a functional block diagram of a dual-peripheral device system in accordance with the present disclosure.
Figure 3:
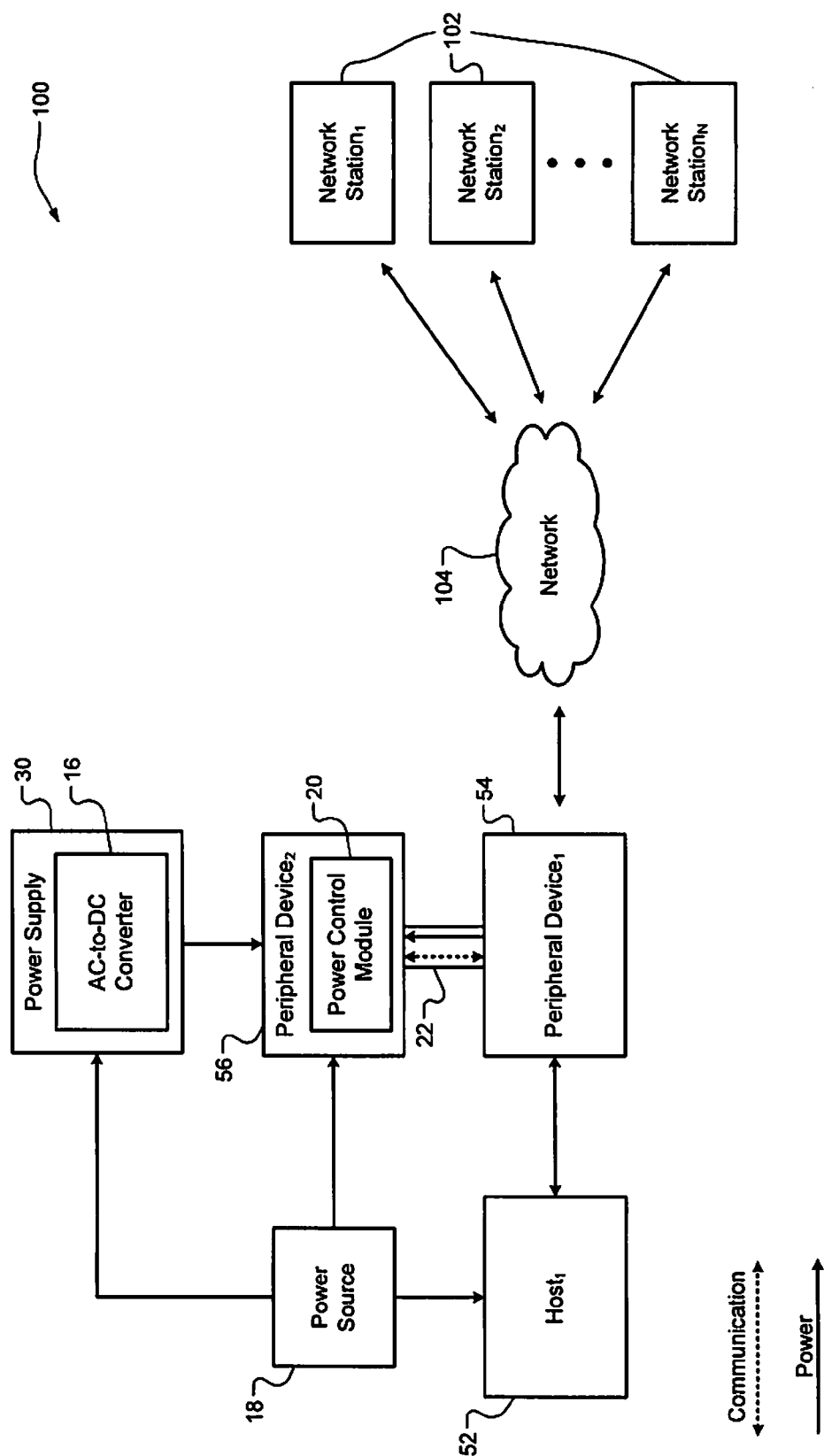
FIG. 3 is a functional block diagram of a dual-peripheral device system with network attached storage access in accordance with the present disclosure.

The host 12 may be, for example, a computer, such as a laptop or desktop computer, a television, a personal data assistant (PDA), a mobile phone, a set top box, etc. The host 12 may be another peripheral device. Examples of peripheral devices that perform as host devices are shown in FIGS. 2 and 3.

The host 12 is connected to the peripheral device 14 via the cable 22. The cable 22 includes communication conductors 24 for transferring data and communication signals between the host 12 and the peripheral device 14. The term "conductors" as used herein may refer to insulated or non-insulated wires, conductive traces, conductive lines, etc. The communication signals may include a standby mode request signal and a reactivate power request signal, which are transmitted from the host 12 to the peripheral device 14.

The standby mode request signal is transmitted when the host 12 requests that the peripheral device transition to a standby mode. The peripheral device 14 transitions to a power OFF mode subsequent to receiving the standby mode request signal, as described below. The reactivate power request signal is transmitted when transitioning from a power OFF mode to a power ON mode. As used herein, a power OFF mode refers to when components of the peripheral device 14 are deactivated (e.g., modules, circuits, regulators, fans, etc. of a peripheral device are powered down). During the power OFF mode, the power control module 20 and/or other components of the peripheral device 14 may remain powered to allow the host 12 to return the peripheral device to an activated state. As an example, the power control module 20 and/or the other components of the peripheral device 14 that remain powered during the power OFF mode may operate based on power from the host 12. As used herein, a power ON mode refers to when the peripheral device 14 is activated (e.g., modules, circuits, regulators, fans, etc. of a peripheral device are powered).

The cable 22 may also include power conductors 26 for supplying power from the host 12 to the peripheral device 14. The power conductors 26 may include a voltage supply conductor (referred to as VS) and a voltage reference (or ground reference) conductor. Power received from the host 12 may be used to power, for example, the power control module 20, an integrated circuit of the power control module 20, and/or other modules and/or circuits of the peripheral device 14. In certain implementations the host 12 may not provide power to the peripheral device 14 and in these implementations the cable 22 may not include the power conductors 26.

The cable 22 may be, for example, a universal serial bus (USE) cable, a serial advanced technology attachment (SATA) cable, an external SATA (eSATA) cable, a serial attached small computer system interface (SAS) cable, or a peripheral component interconnect express (PCIE) cable. The cable 22 may be a video graphics array (VGA) cable, a digital visual interface (DVI) cable or high-definition multimedia interface (HDMI) cable.

Figure 5:
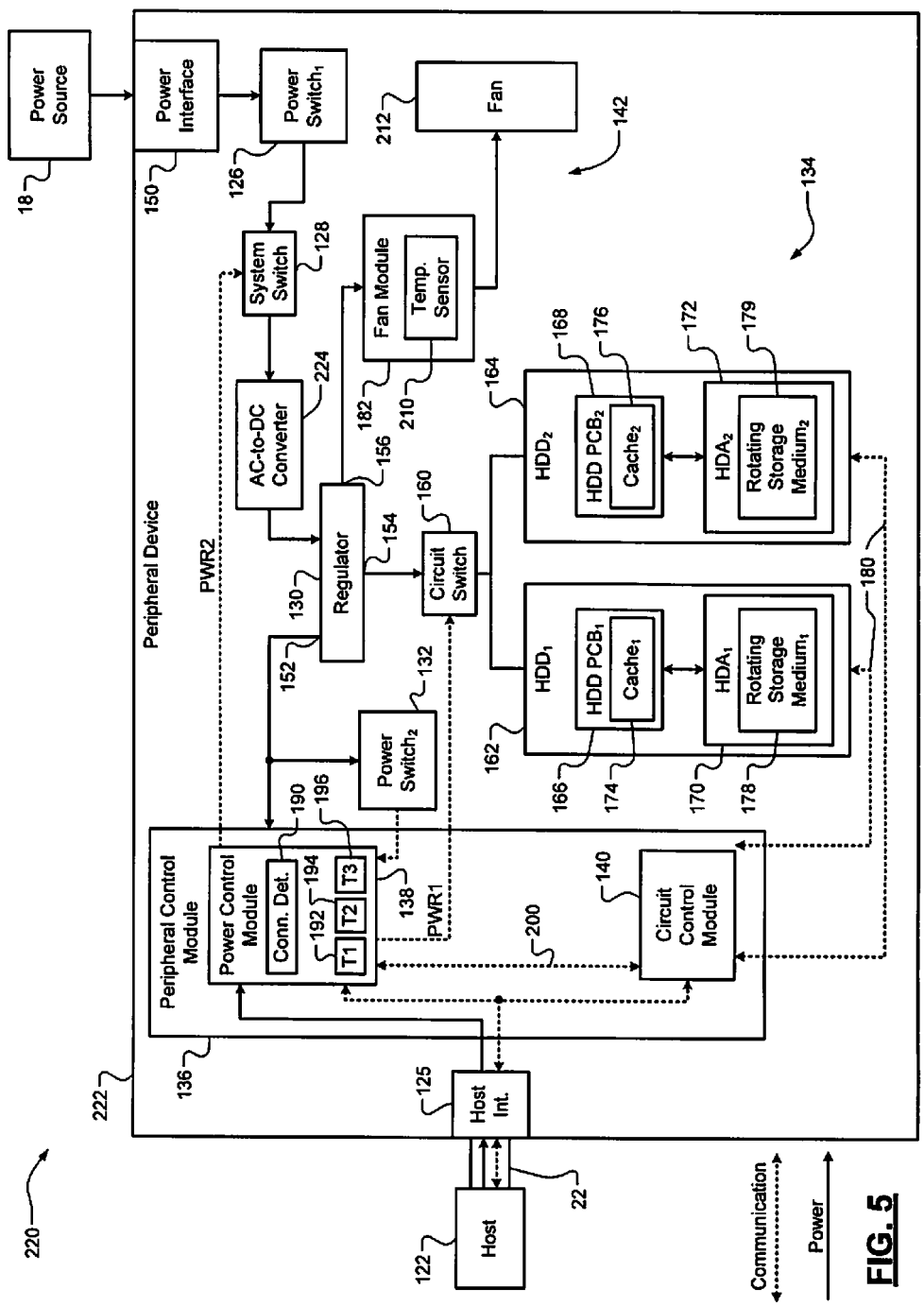
FIG. 5 is a functional block diagram of another peripheral system incorporating a single regulator and an internal converter in a peripheral device and in accordance with the present disclosure.
Figure 6:
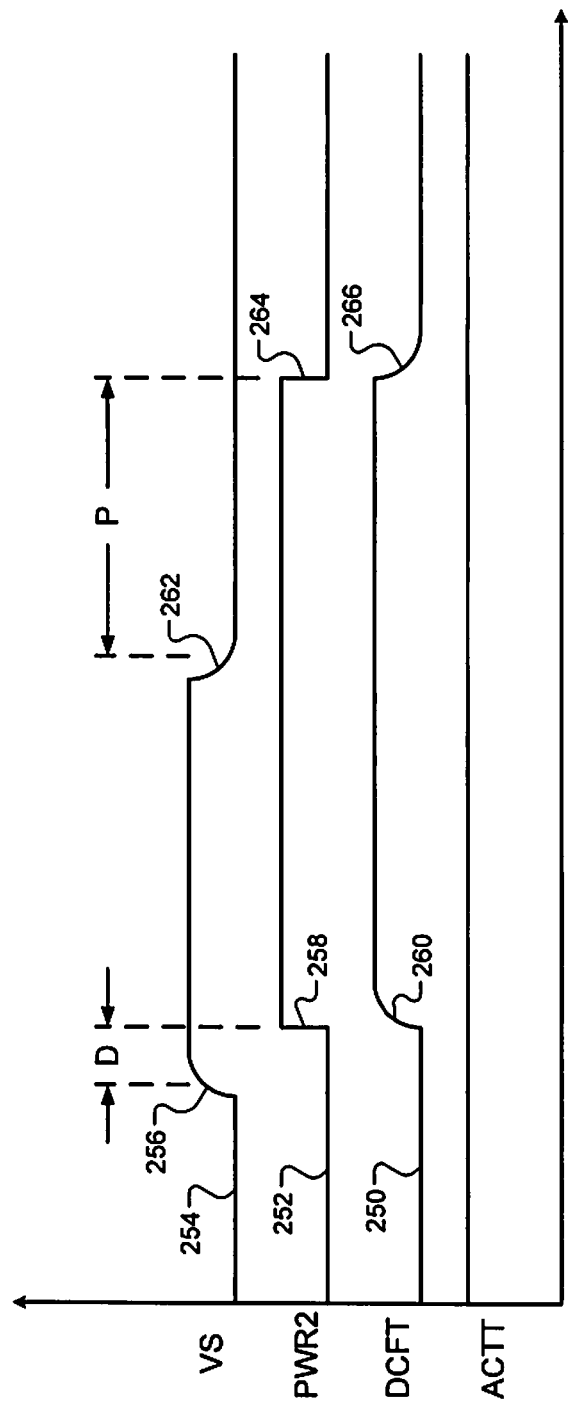
FIG. 6 is a signal flow diagram illustrating power usage during modes of a peripheral device in accordance with the present disclosure.
Figure 7:
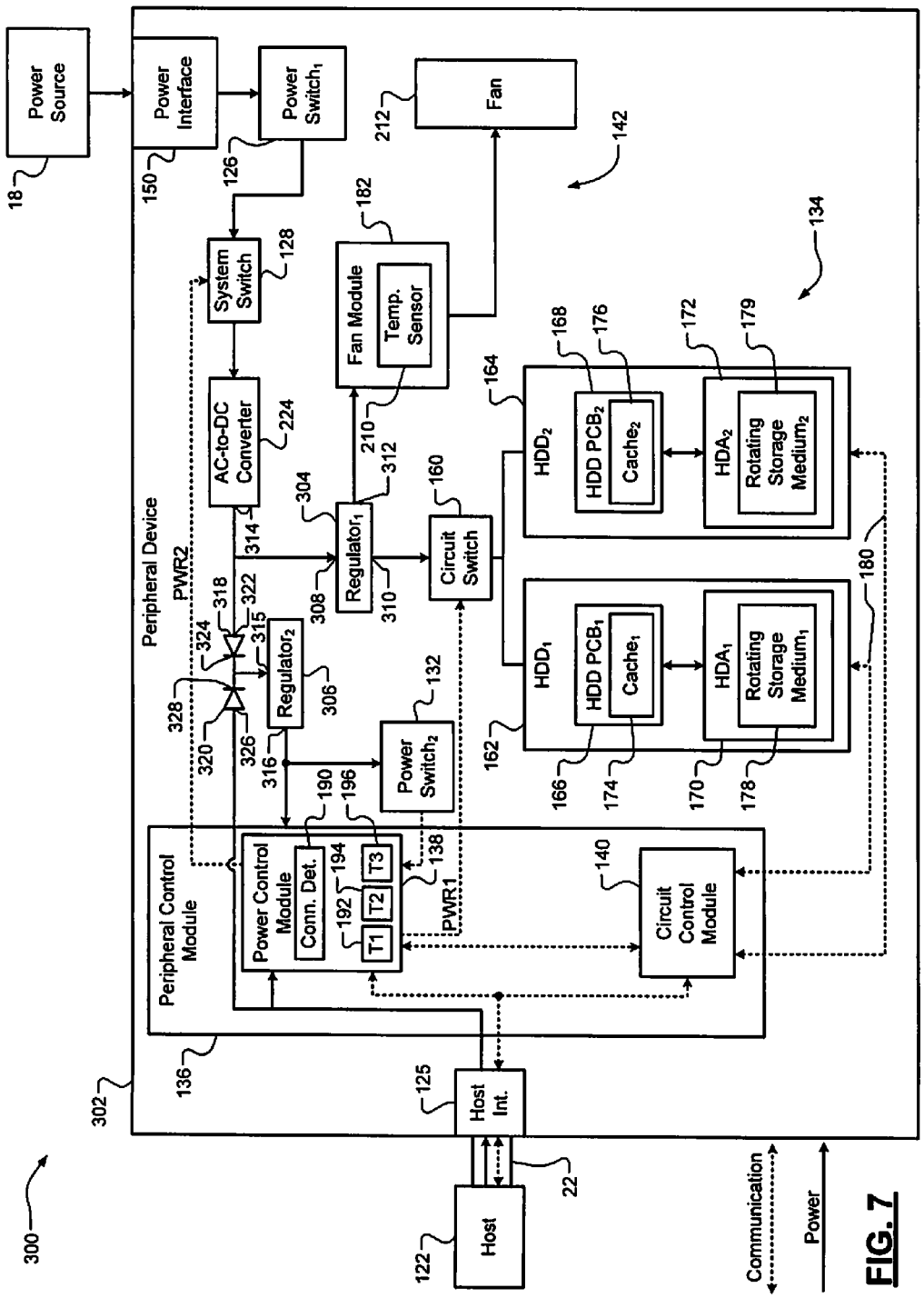
FIG. 7 is a functional block diagram of a peripheral system incorporating dual regulators and an internal converter in a peripheral device and in accordance with the present disclosure.

The peripheral device 14 may be a storage device, a printer, a digital video recorder, a set top box, a projector, a scanner, or other device that receives power from an external power source other than the host 12. In addition to the power received from the host 12, the peripheral device 14 receives power from the power source 18. The power source 18 is external to the peripheral device 14. The power source 18 may be, for example, a utility power source outlet with an AC output voltage (e.g., 120 volts(s) AC). The power source 18 may include one or more power sources. The power source 18 may be a power source shared by the host 12 and the peripheral device 14. In implementations in which an AC power source is used, the peripheral system 10 includes the AC-to- DC converter 16. The AC-to-DC converter 16 may be external to the peripheral device 14 and included in a power supply 30, as shown. Alternatively, the AC-to-DC converter 16 may be included in the peripheral device 14, as shown in FIGS. 5-7. Although the power source 18 is shown as an AC power source, the power source 18 may be a DC power source (e.g., a battery). The power supply 30 may not be included in the peripheral system 10 when the power source 18 is a DC power source.

In FIG. 2, a dual-peripheral device system 50 is shown. The dual-peripheral device system 50 includes a first host 52, a first peripheral device (or second host) 54, a second peripheral device 56, the power supply 30 and the power source 18. The first host 52 may be, for example, a computer, a television, a set top box, or other suitable host. The first host 52 may be a redundant array of independent disks (RAID) enclosure or controller that maintains content in the first peripheral device 54. The first peripheral device 54 may be, for example, a wireless/Ethernet router, a USB switch, a DVD recorder, a set top box, a network attached storage device, or other suitable peripheral device.

The second peripheral device 56 is connected to the first peripheral device 54 via the cable 22. The cable 22 includes the communication conductors 24 and may include the power conductors 26. The second peripheral device 56 includes the power control module 20. The power control module 20 powers down and powers up the second peripheral device 56 based on: a standby mode request signal from the first peripheral device 54; a connection between the first peripheral device 54 and the second peripheral device 56 being disconnected; and/or communication activity between the first peripheral device 54 and the second peripheral device 56 being ceased for a predetermined period of time. The standby mode request signal may be generated by the first peripheral device 54 in response to another standby mode request signal transmitted from the first host 52 to the first peripheral device 54. A connection between the first peripheral device 54 and the second peripheral device 56 may be disconnected when the cable 22 is disconnected from the first peripheral device 54 and/or the second peripheral device 56.

Figure 4:
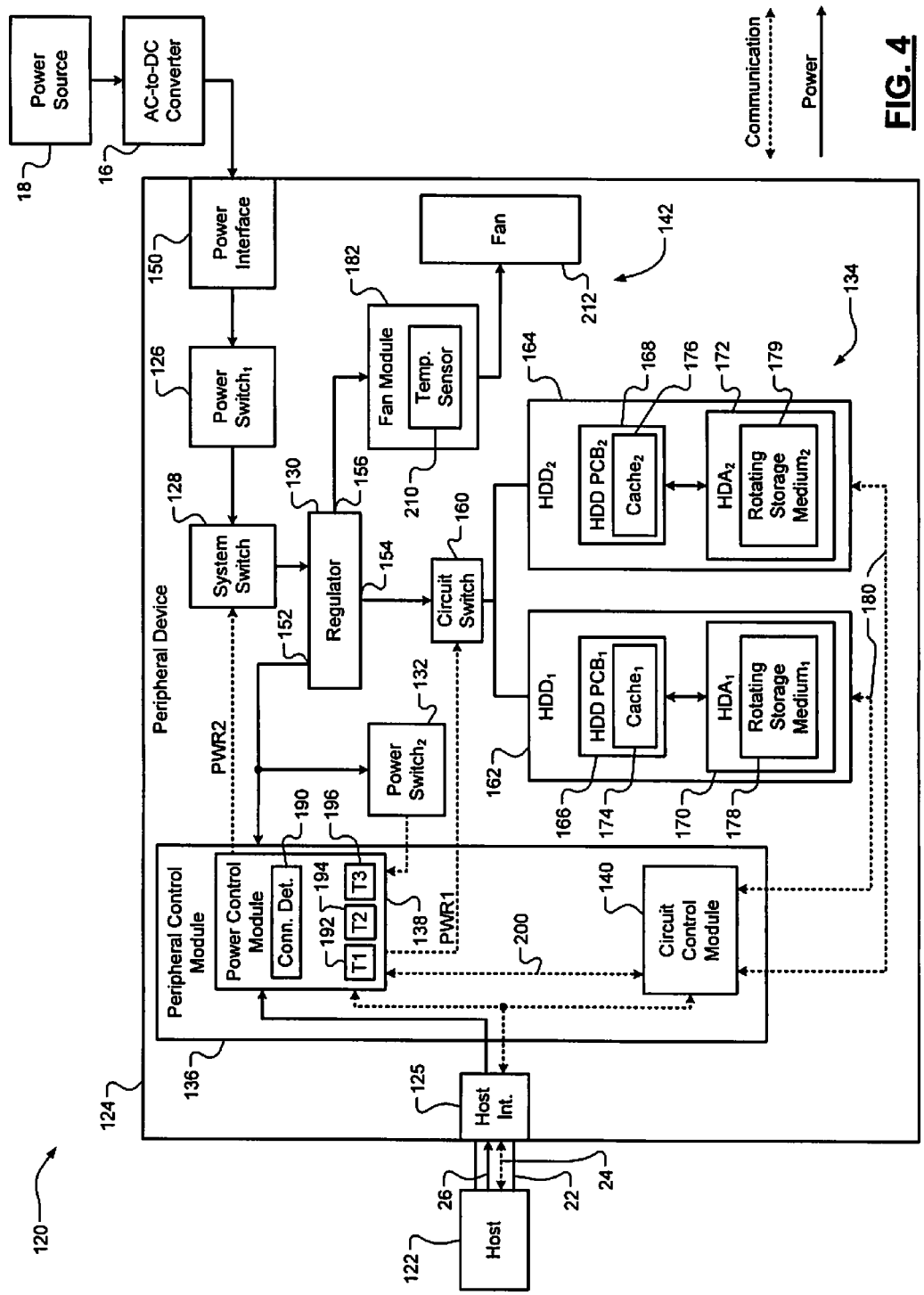
FIG. 4 is a functional block diagram of a peripheral system incorporating a single regulator and an external converter in a peripheral device and in accordance with the present disclosure.

The second peripheral device 56 may be a storage drive or other suitable peripheral device. The second peripheral device 56 may provide additional storage to supplement storage in the first peripheral device 54. As an example, the second peripheral device 56 may include one or more HDDs with rotating storage mediums and used to store audio and/or video content accessed by the first host 52 via the first peripheral device 54. Peripheral devices with HDDs and rotating storage mediums are shown in FIGS. 4-6. The second peripheral device 56 may be, for example, a USB RAID enclosure.

The first peripheral device 54 may receive power from the power source 18 and supply power via the cable 22 to the second peripheral device 56. In addition to the power received from the first peripheral device 54, the second peripheral device 56 receives power from the power source 18. The power source 18 is external to the second peripheral device 56. In implementations in which an AC power source is used, the dual-peripheral device system 50 includes the AC-to-DC converter 16. The AC-to-DC converter 16 may be external to the second peripheral device 56 and included in the power supply 30, as shown. Alternatively, the AC-to-DC converter 16 may be included in the second peripheral device 56. Although the power source 18 is shown as an AC power source, the power source 18 may be a DC power source. The power supply 30 may not be included in the dual-peripheral device system 50 when the power source 18 is a DC power source.

In FIG. 3, a dual-peripheral device system 100 with network attached storage access is shown. The dual-peripheral device system 100 includes the first host 52, the first peripheral device 54, the second peripheral device 56, the power supply 30, and the power source 18. In the implementation of FIG. 3, the first peripheral device 54 is a network attached storage (NAS) device. The first peripheral device 54 communicates via a wired or wireless medium to network stations 102 via a network 104. The first peripheral device 54 may communicate with the network stations 102 using, for example, one or more IEEE standards 802.11, 802.11a, 802.11b, 802.11g, 802.11h, 802.11n, 802.16, and 802.20.

The network stations 102 may be computers, mobile phones, set top boxes, televisions, or other network accessible devices. The network stations 102 may access data stored in the first peripheral device 54 via the network 104. The network 104 may include the Internet, a local area network (LAN), a wide area network (WAN), and/or other suitable networks. The first peripheral device 54 stores and allows users to protect and share data. Data of a first user (of the first host 52 or one of the network stations 102) may be shared, viewed and/or edited by other users (of the first host 52 or other one of the network stations 102).

In FIG. 4, a peripheral system 120 is shown. The peripheral system 120 includes a host 122 (e.g., one of hosts 12, 54 of FIGS. 1-3), a peripheral device 124 (e.g., one of the peripheral devices 14, 56 of FIGS. 1-3), the AC-to-DC converter 16 and the power source 18. In this implementation the AC-to-DC converter 16 is external to the peripheral device 124. The host 122 is connected to a host interface 125 of the peripheral device 124 via the cable 22. The peripheral device 124 includes a first power switch 126, a system switch 128, a regulator 130, a second power switch 132, a peripheral circuit 134, a peripheral control module 136 with a power control module 138 and a circuit (or HDD) control module 140, and a fan circuit 142. The power control module 138 controls activation and deactivation of the peripheral device 124. The circuit control module 140 controls data transfer operations of the peripheral circuit 134 including data transfers between the host 122 and the peripheral circuit 134 and between storage devices in the peripheral circuit 134.

The first power switch 126 includes a CLOSED (or ON) state and an OPEN (or OFF) state. The first power switch 126 may be mounted on an external housing (not shown) of the peripheral device 124 and used to manually transition the peripheral device 124 between power ON and power OFF modes. Power from the AC-to-DC converter 16 may be received by the first power switch 126 via a power interface 150 prior to being received by any other component of the peripheral device 124. The peripheral device 124 is deactivated when the first power switch 126 is in the OPEN state and may be activated when one or more of the first and second power switches 126, 132 are transitioned to and/or in CLOSED states.

The system switch 128 receives power from the first power switch 126 and transfers the power to the regulator 130 depending upon the state of the system switch 128. The system switch 128 includes a CLOSED state and an OPEN state. Power is transferred from the first power switch 126 to the regulator 130 via the system switch 128 when the system switch 128 is in the CLOSED state. Power is not transferred to the regulator 130 when the system switch 128 is in the OPEN state. The peripheral device 124 is deactivated when the system switch 128 is in the OPEN state. The system switch 128 may be an electric switch, a relay, or other suitable switch.

The regulator 130 receives power via the first power switch 126 and the system switch 128. The regulator 130 may be, for example, a voltage regulator and include voltage outputs. The voltage outputs may have different voltages. As an example, the regulator 130 includes three voltage outputs 152, 154, 156. The first voltage output 152 provides a first voltage (e.g., 1V, 1.8V, 2.5V and 3V) to the peripheral control module 136. The second and third voltage outputs 154, 156 provide a second voltage and a third voltage respectively to the peripheral circuit 134 and the fan circuit 142. The second voltage may be equal to or different than the third voltage. Some example second and third voltages are 5V, 9V, and 12V.

The second power switch 132 (sometimes referred to as a soft power switch) receives power from the regulator 130 and transfers the power from the regulator 130 to the power control module 138 when transitioned to the CLOSED state. The second power switch 132 may transition to a CLOSED state when pressed and return to an OPEN state when released. The second power switch 138 may provide an interrupt signal to the power control module 138 to indicate that the second power switch 132 has transitioned to the CLOSED state. Power is not transferred from the regulator 130 through the second power switch 132 to the power control module 138. The second power switch 132 may be externally mounted on the housing of the peripheral device 124 and used to perform a soft shut down of the peripheral device 124. A soft shutdown includes flushing data in volatile memories to non-volatile memories prior to deactivation of the peripheral device 124. The power control module 138 may generate first and second power enable signals PWR1, PWR2 based on the second power switch 132 transitioning to the CLOSED state. The first and second power enable signals PWR1, PWR2 are provided respectively to the system switch 128 and a circuit (or HDD) switch 160 to activate the peripheral device 124 and the peripheral circuit 134.

The peripheral circuit 134 may include one or more HDDs 162, 164. The circuit switch 160 activates the HDDs 162, 164 based on the first power enable signal PWR1. Power is transferred from the second voltage output 154 to the HDDs 162, 164 via the circuit switch 160 when the circuit switch 160 is in a CLOSED state. Power is not transferred from the regulator 130 to the HDDs 162, 164 when the circuit switch 160 is in an OPEN state. The circuit switch 160 may be an electric switch, a relay, or other suitable switch.

The HDDs 162, 164 may include HDD printed circuit boards (PCBs) 166, 168 and hard disk assemblies (HDAs) 170, 172. The HDD PCBs 166, 168 include respective caches (or volatile memories) 174, 176. Although the HDDs 162, 164 are shown as including HDD PCBs 166, 168, the HDD PCBs 166, 168 may be replaced with HDD integrate circuits (ICs) with the caches 174, 176. The HDAs 170, 172 include respective rotating storage mediums 178, 179. The HDDs 162, 164 are accessed by the circuit control module 140 via communication conductors 180. The communication conductors 180 may be, for example, SATA or SAS conductors. The circuit control module 140 may perform as a bridge between two different data formats. For example, the circuit control module 140 may perform as a USB-to-SATA converter to change format of data transferred between the host 122 and the HDDs 162, 164 when the cable 22 is a USB cable.

The peripheral control module 136 may be an integrated circuit and include one or both of the power control module 138 and the circuit control module 140. In one implementation, the peripheral control module 136 is not included and the power control module 138 and the circuit control module 140 are included and implemented as separate modules. Although not shown, the peripheral control module 136 may include a fan module 182 of the fan circuit 142.

The peripheral control module 136 may receive and operate based on power from the host 122 via the power conductors 26 and/or power from the regulator 130. The power received from the host 122 may be monitored by the power control module 138. The power control module 138 may control states of the system switch 128 and/or the circuit switch 160 based on state of the power received from the host.

The power control module 138 may include a connection detection module 190. As a first example, the connection detection module 190 may monitor the communication conductors 24 and the power conductors 26 to determine whether the cable 22 is connected between the host 122 and the peripheral device 124. The connection detection module 190 may determine that the cable 22 is connected when the peripheral control module 136, the power control module 138, and/or the circuit control module 140 are able to connect to and communicate with the host 122.

The connection detection module 190 may determine that the cable 22 is connected when the power control module 138 detects a predetermined voltage and/or current on the power conductors 26. The connection detection module 190 may determine that the cable 22 is connected when voltage and/or current on the power conductors 26 are within one or more respective predetermined ranges.

As another example, the connection detection module 190 may perform as a squelch detector and detect state of a communication signal on the communication conductors 24. The connection detection module 190 may perform differential envelope detection techniques to detect whether a differential signal between the communication conductors 24 has a magnitude of greater than a squelch (or predetermined) threshold. If the magnitude of the differential signal is greater than the squelch threshold then the connection detection module 190 may determine that the cable 22 is connected between the host 122 and the peripheral device 124. As still another example, the connection detection module 190 may detect impedances of one or more conductors of the cable 22 and/or impedances between the communication conductors 24 to determine if the cable 22 is connected between the host 122 and the peripheral device 124.

The power control module 138 may include timers. The timers may include a first timer 192, a second timer 194, and a third timer 196. The first timer 192 may be used to determine whether the second power switch is in a CLOSED state for more than a first predetermined period. The second timer 194 may be used to determine whether the cable 22 has been disconnected from the host 122 and/or the peripheral device 124 for a second predetermined period. The third timer 196 may be used to determine whether there has not been communication activity between the host 122 and the peripheral device 124 and/or power has not been received from the host 122 by the peripheral device 124 for more than a third predetermined period.

The power control module 138 activates the peripheral circuit 134 and/or the HDDs 162, 164 and deactivates the peripheral device 124 based on states of the timers 192, 194, 196. As an example, the first, second and third predetermined periods may each be, for example, 2-5 seconds (s). The first, second and third predetermined periods may be the same or different. This is further described with respect to the method of FIG. 10.

The power control module 138 instructs the circuit control module 140 via a shutdown request signal 200 to operate in a shutdown mode. During the shutdown mode, the circuit control module 140 flushes the caches 174, 176 to the respective rotating storage mediums 178, 179. The power control module 138 may generate the shutdown request signal 200 when: the second power switch 132 is transitioned (or toggled) to the OPEN state; the cable 22 is disconnected from the host 122 and/or the peripheral device 124; communication activity between the host 122 and the peripheral device 124 has ceased; power is no longer received from the host 122 by the peripheral device 124; one of the timers 192, 194, 196 is up (i.e. one of the predetermined periods has been exceeded); and/or subsequent to determining that the peripheral device 124 is to be deactivated. Power to the peripheral device 124 is deactivated when the first power switch 126 is transitioned to the OPEN state. Power to the peripheral control module 136 and/or the power control module 138 may remain when the peripheral device 124 is deactivated. Power may be supplied from the host 122 to the peripheral control module 136 and/or the power control module 138 when the peripheral device 124 is deactivated.

The fan circuit 142 includes the fan module 182, a temperature sensor 210 and a fan 212. The fan 212 is used to cool components within the peripheral device 124. The fan module 182 controls activation, deactivation and speed of the fan 212. The fan module 182 may activate, deactivate and/or adjust speed of the fan 212 based on a temperature detected by the temperature sensor 210. The fan module 182 may receive power from the third output 156 of the regulator 130 and supply power to the fan 212.

In FIG. 5, a peripheral system 220 is shown and includes the host 122, a peripheral device 222, and the power source 18. The host 122 is connected to the peripheral device 222 via the cable 22 at the host interface 125. The peripheral device 222 includes the power interface 150, the first power switch 126, the system switch 128, an AC-to-DC converter 224, the regulator 130, the second power switch 132, the peripheral circuit 134, the peripheral control module 136 with the power control module 138 and the circuit control module 140, and the fan circuit 142. In this implementation the AC-to-DC converter 224 is internal to the peripheral device 222.

The peripheral circuit 134 may include the HDDs 162, 164 with the HDD PCBs 166, 168 and HDAs 170, 172. The HDD PCBs 166, 168 include the caches 174, 176. The HDAs 170, 172 include the rotating storage mediums 178, 179. The power control module 138 may include the timers 192, 194, 196 and control states of the switches 128, 160 based on the timers 192, 194, 196. The fan circuit 142 includes the fan module 182 and the fan 212. The fan module 182 includes the temperature sensor 210.

The AC-to-DC converter 224 is included in the peripheral device 222 to further minimize power consumption when the peripheral device 222 is inactive (i.e. there is no communication activity between the host 122 and the peripheral device 222) and/or deactivated. This eliminates "vampire" power or standby power used by components of the peripheral device 222 when the peripheral device 222 is no longer communicating with the host 122. Vampire power refers to electric power consumed by a peripheral device (sometimes referred to as electronic appliance) while the peripheral device is switched OFF or is in a standby mode.

Referring also to FIG. 6, a signal flow diagram illustrating power usage during modes of a peripheral device (e.g., one of the peripheral devices 124, 222 of FIGS. 4 and 5) is shown. The signal flow diagram includes an AC signal ACTT, a DC signal DCFT, the second power enable signal PWR2, and a voltage supply signal VS. The AC signal ACTT is the AC power provided to an AC-to-DC converter (e.g., one of the converters 16 and 224). The DC signal DCFT is the DC power provided from the AC-to-DC converter. The second power enable signal PWR2 is a voltage signal and is generated by the power control module 138 and controls state of the system switch 128. The voltage supply signal VS is a voltage signal and is generated by the host 122 and is the power received by the peripheral device via the power conductors 26 of the cable 22.

During the power OFF mode, the AC signal ACTT is active or in an ON state, as AC power may be supplied from the power source 18 to the power interface 150 regardless of the state of the switches 126, 128, 132, 160 in the peripheral device. During the power OFF mode, the DC signal DCFT, the second power enable signal PWR2, and the voltage supply signal may be LOW are equal to zero, as designated respectively by 250, 252, 254.

The cable 22 may be attached and power may be supplied from the host 122 to the peripheral device to activate the peripheral device. The second power supply signal PWR2 may be transitioned from a LOW state (e.g., 0V) to a HIGH state (e.g., 1-5V) to transition the peripheral device from the power OFF mode to the power ON mode. This is shown at 256. The second power enable signal PWR2 is transitioned from a LOW state to a HIGH state in response to the voltage supply signal VS transitioning to the HIGH state at 258. The power control module 138 may wait a predetermined delay period D prior to transitioning the second power enable signal PWR2 to the HIGH state to assure that the voltage supply signal VS remains in the HIGH state. The DC signal DCFT transitions to a HIGH state when the second power enable signal PWR2 transitions to the HIGH state, as shown at 260.

The power control module 138 may deactivate the peripheral device when the voltage supply signal VS transitions to the LOW state. A transition to the LOW state is shown at 262. The voltage supply signal VS may transition to the LOW state when the host 122 ceases to supply power to the peripheral device or when the cable 22 is disconnected from the host 122 and/or the peripheral device.

The power control module 138 may transition the second power enable signal PWR2 to the LOW state in response to the voltage supply signal transitioning to the LOW state. The system switch 128 transitions to an OPEN state when the second power enable signal PWR2 transitions to the LOW state. The power control module 138 waits a predetermined period P (e.g., 2-5 seconds(s)) prior to transitioning the second power enable signal PWR2 to the LOW state. The transition of the second power enable signal PWR2 to the LOW state is shown at 264. The DC signal DCFT transitions to a LOW state when the second power enable signal PWR2 transitions to the LOW state, as shown at 266.

During the predetermined period P, the HDDs 162, 164 may flush the caches 174, 176 to the rotating storage mediums 178, 180. This prevents loss of data when the peripheral device is deactivated. The predetermined period P also assures that power is not supplied from the host 122 to the peripheral device for a short temporary period (i.e. a period less than the predetermined period P) and then resupplied to the peripheral device.

For example a user may disconnect the peripheral device from the host 122 for the short temporary period and then reconnect the peripheral device to the host 122 or connect the peripheral device to another host within the predetermined period P. If the peripheral device is deactivated without waiting the predetermined period P, there may be a delay in accessing the HDDs 162, 164 due to time associated with reactivating the peripheral device. By waiting the predetermined period P, the power control module 138 assures that a power deactivation of the peripheral device is appropriate and prevents delays associated with powering and activating the peripheral device should deactivation not be desired.

By waiting the predetermined period P, the power control module 138 also prevents deactivation of the peripheral device due to a false voltage supply signal or other false signal indicating that a deactivation of the peripheral device should be performed. For example, if the voltage supply signal VS reduces in voltage or exhibits noise for a period less than the predetermined period P, the power control module 138 does not deactivate the peripheral device.

The HDDs 162, 164 may be deactivated prior to or subsequent to the predetermined period P lapsing. The power control module 138 may transition the first power enable signal PWR1 to a LOW state during the predetermined period P or subsequent to the predetermined period P. The circuit switch 160 is transitioned to an OPEN state when the first power enable signal PWR1 is transitioned to the LOW state.

The signal flow diagram of FIG. 6 applies to implementations when AC power is supplied to the peripheral device. In implementations when AC power is not supplied to the peripheral device, the power source 18 may be a DC power source in which case the AC-to-DC converter may not be included in the peripheral device. A first DC power signal may be provided from the power source 18 to the peripheral device and remain in an ON state, similar to the AC signal ACTT. A second DC power signal may be supplied from the system switch 128 to the regulator 130 and may be transitioned between LOW and HIGH states based on the second power enable signal PWR2, similar to the DC signal DCFT.

In FIG. 7, a peripheral system 300 is shown and includes the host 122, a peripheral device 302, and the power source 18. The host 122 is connected to the peripheral device 302 via the cable 22 at the host interface 125. The peripheral device 302 includes the power interface 150, the first power switch 126, the system switch 128, the AC-to-DC converter 224, a first regulator 304, a second regulator 306, the second power switch 132, the peripheral circuit 134, the peripheral control module 136, and the fan circuit 142. In this implementation the AC-to-DC converter 224 is internal to the peripheral device 302.

The first regulator 304 supplies power to the peripheral circuit 134 and the fan circuit 142 including high-power components of the circuits 134, 142, such as the HDDs 162, 164 and the fan 212. The second regulator 306 supplies power the peripheral control module 136, which is a low-power component. The peripheral control module 136 consumes less power than each of the circuits 134, 142. The first regulator 304 may, for example, convert a DC voltage at an output 314 of the AC-to-DC converter 224 to a high-voltage (e.g., 5-12V DC). The second regulator 306 may, for example, convert the DC voltage at the 314 to a low-voltage (e.g., 1-5V DC).

The first regulator 304 has an input 308 and two outputs 310, 312. The input 308 is connected to an output 314 of the AC-to-DC converter 224. The outputs 310, 312 may be at the same voltage or may be at different voltages. The first output 310 supplies power to the peripheral circuit 134. The second output 312 supplies power to the fan circuit 142.

The second regulator 306 includes an input 315 and an output 316. The input 315 is connected to the output 314 of the AC-to-DC converter 224 via a first diode 318. The input 315 is also connected to the power control module 138 and the host interface 125 via a second diode 320. The first diode 318 has a first anode 322 and a first cathode 324. The second diode 320 has a second anode 326 and a second cathode 328. The first anode 322 is connected to the output 314. The first cathode 324 is connected to the second cathode 328 and to the input 315. The second anode 326 is connected to the power control module 138 and the host interface 125. The first diode 318 prevents reverse current flow to the AC-to-DC converter 224 from the host interface 125. The second diode 320 prevents reverse current flow from the AC-to-DC converter 224 to the host interface 125 and the power control module 138. The output 316 provides power to the peripheral control module 136.

The peripheral circuit 134 may include the circuit switch 160 and the HDDs 162, 164 with the HDD PCBs 166, 168 and HDAs 170, 172. The HDD PCBs 166, 168 include the caches 174, 176. The HDAs 170, 172 include the rotating storage mediums 178, 179. The peripheral control module 136 includes the power control module 138 and the circuit control module 140. The power control module 138 may include the timers 192, 194, 196 and controls states of the switches 128, 160 based on the timers 192, 194, 196. The fan circuit 142 includes the fan module 182 and the fan 212. The fan module 182 includes the temperature sensor 210.

Figure 8:
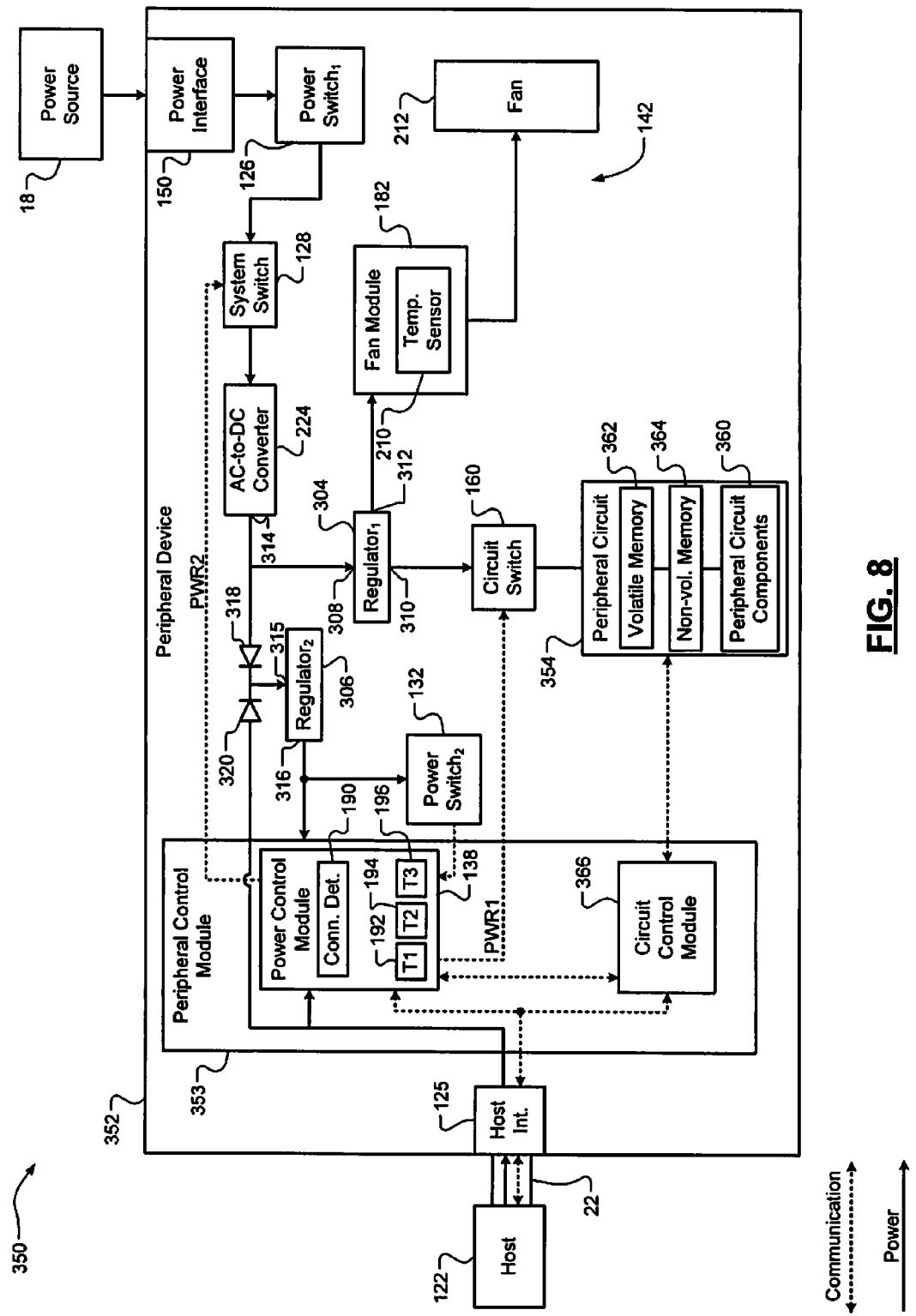
FIG. 8 is a functional block diagram of yet another peripheral system incorporating dual regulators, an internal converter and a circuit switch in a peripheral device and in accordance with the present disclosure.

Although FIGS. 4-7 are described primarily with respect to storage drive implementations, the implementations of FIGS. 4-7 may be easily modified for other peripheral device implementations. In FIG. 8, a peripheral system 350 that includes a peripheral device 352 is shown. In one implementation, the peripheral device 352 is implemented as a storage device. In other implementations, the peripheral device 352 is implemented as a printer, a projector, a scanner, or other peripheral device.

The peripheral system 350 includes the host 122, the peripheral device 352, and the power source 18. The host 122 is connected to the peripheral device 352 via the cable 22 at the host interface 125. The peripheral device 352 includes the power interface 150, the first power switch 126, the system switch 128, the AC-to-DC converter 224, the first regulator 304, the second regulator 306, the second power switch 132, a peripheral circuit 354, a peripheral control module 353, and the fan circuit 142. In this implementation the AC-to-DC converter 224 is internal to the peripheral device 352.

The first regulator 304 supplies power to the peripheral circuit 354 and the fan circuit 142. The second regulator 306 supplies power to the peripheral control module 138, which is a low-power component. The peripheral control module 353 consumes less power than each of the circuits 354, 142. The first regulator 304 may, for example, convert a DC voltage at the output 314 of the AC-to-DC converter 224 to a high-voltage (e.g., 5-12V DC). The second regulator 306 may, for example, convert the DC voltage at the output 314 to a low-voltage (e.g., 1-5V DC).

The first regulator 304 includes the input 308 and the outputs 310, 312. The input 308 is connected to the output 314. The first output 310 supplies power to the peripheral circuit 354 via the circuit switch 160. The second output 312 supplies power to the fan circuit 142.

The second regulator 306 includes the input 315 and an output 316. The input 315 is connected to the output 314 via the first diode 318. The input 315 is also connected to the power control module 138 and the host interface 125 via the second diode 320. The first diode 318 prevents reverse current flow to the AC-to-DC converter 224 from the host interface 125. The second diode 320 prevents reverse current flow from the AC-to-DC converter 224 to the host interface 125 and power control module 138. The output 316 provides power to the peripheral control module 353.

The peripheral circuit 354 receives power from the first regulator 304 based on state of the circuit switch 160. The peripheral circuit 354 may include one or more of each of a HDD, a printer mechanism, a projection lamp circuit, a scanner lamp circuit, a motor, a heater, a tape drive, an optical disk drive, or other high-power components (designated in FIG. 8 as peripheral circuit components 360). As a few examples, the peripheral circuit components 360 include a printer mechanism, a projection lamp circuit, a scanner lamp circuit, or a motor when the peripheral device 352 is respectively a printer, a projector, a scanner, or a DVD burner.

The peripheral circuit 354 may also include a volatile memory 362 and a non-volatile memory 364. Data stored in the volatile memory 362 may be flushed to the non-volatile memory 364 prior to deactivation of the peripheral device 352.

The peripheral control module 353 includes the power control module 138 and a circuit control module 366. The power control module 138 may include the timers 192, 194, 196 and controls states of the switches 128, 160 based on the timers 192, 194, 196. The circuit control module 366 controls operation of the peripheral circuit 354 and data transfer between the host 122 and the peripheral circuit 354. The fan circuit 142 includes the fan module 182 and the fan 212. The fan module 182 includes the temperature sensor 210.

Figure 9:
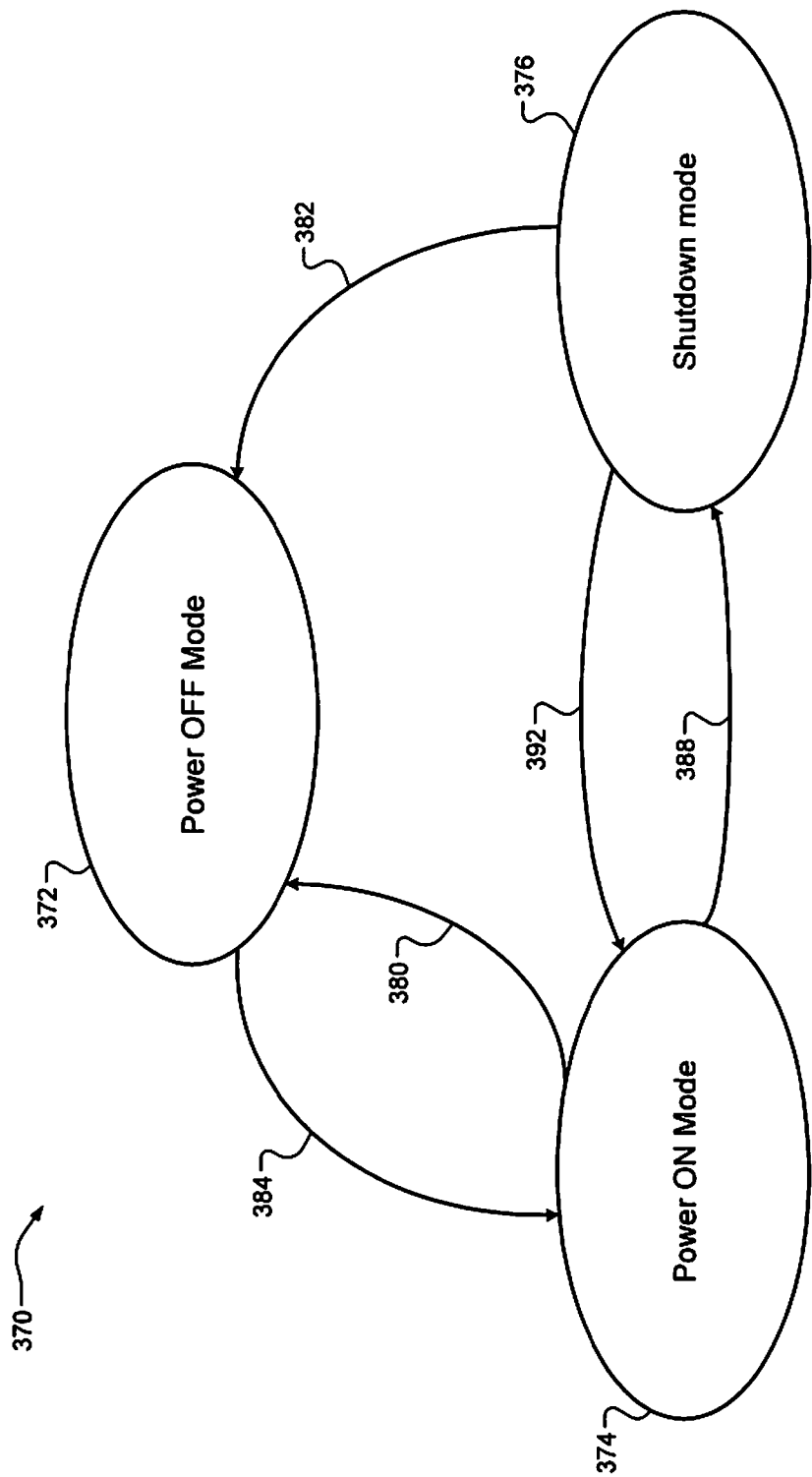
FIG. 9 is a state diagram illustrating operation of a peripheral device in accordance with the present disclosure.

Referring also to FIG. 9, a state diagram 370 illustrating operation of a peripheral device is shown. Although the state diagram is described primarily with respect to the peripheral device 352 of FIG. 8, the peripheral devices 14, 56, 124, 222, 302, 352 of FIGS. 1-5 and 7 may operate in and transition between the modes of the state diagram 370, as described below. The peripheral device operates in a power OFF mode 372, a power ON mode 374, and a shutdown mode 376.

During the power OFF mode 372, the first power switch 126 is in an OPEN (or OFF) state. The peripheral device may be transitioned from the power ON mode 374 and the shutdown mode 376 to the power OFF mode 372 when the first power switch 126 is transitioned to the OPEN state, shown respectively by arrows 380, 382.

During the power ON mode 374: the peripheral device is activated; the peripheral device may receive power from the host 122 via the cable 22; and the host 122 may be communicating with the peripheral device, the peripheral control module 353, and/or the circuit control module 366 to perform read, erase, and/or write tasks. The components of the peripheral device are power ON when the peripheral device is activated, as described above. Components of the peripheral device are power OFF when the peripheral device is deactivated, except for components supplied power received from the host 122. During the power ON mode 374, the first power switch 126, the system switch 128 and the circuit switch 160 are in CLOSED (or ON) states. During the power ON mode 374, the second power switch 132 may be in an OPEN state. The peripheral device may be transitioned from the power OFF mode 372 to the power ON mode when the first power switch 126 is transitioned to the CLOSED state, as shown by arrow 384.

During the shutdown mode 376, the power control module 138 may transmit a shutdown request signal to the circuit control module 366. The circuit control module 366 may instruct the peripheral circuit 354 to flush data in the volatile memory 362 to the non-volatile memory 364. During the shutdown mode 376, the peripheral circuit 354 may be deactivated via the circuit switch 160.

The power control module 138 transitions from the power ON mode 374 to the shutdown mode 376, for example, when: the second power switch 132 is transitioned to the CLOSED state; the host 122 is no longer providing power to the peripheral device; communication between the host 122 and the peripheral device ceases for the third predetermined period; and/or the cable 22 is disconnected from the host 122 and/or the peripheral device. The transition from the power ON mode 374 to the shutdown mode 376 is designated by arrow 388.

During the shutdown mode 376, the first power switch 126 is in the CLOSED state, but the peripheral device is deactivated. The power control module 138 may wait a fourth predetermined period prior to transitioning from the shutdown mode 376 to the power OFF mode 372. The transition from the shutdown mode to the power OFF mode 372 is designated by arrow 382. The power control module 138 transitions from the shutdown mode 376 to the power OFF mode 372 when the first power switch 126 is transitioned and/or in the OPEN state.

The power control module 138 may transition from the shutdown mode 376 to the power ON mode 374 when the first power switch 126 is in the CLOSED state; the second power switch 132 is transitioned to the OPEN state prior to an end of the first predetermined period; the cable 22 is connected from the host 122 to the peripheral device prior to an end of the second predetermined period; there is communication activity between the host 122 and the peripheral device prior to an end of the third predetermined period; and/or power is supplied from the host 122 to the peripheral device prior to an end of the third predetermined period. This transition is designated by arrow 392.

If the peripheral device receives a standby mode request signal from the host 122, the power control module 138 may wait a predetermined period and then deactivate the peripheral device instead of maintaining power to the regulators 304, 306, the fan module 182 and the fan 212. Power to the peripheral control module 353 may be maintained and supplied from the host when other components of the peripheral device are deactivated and the cable 22 is connected between the host 122 and the peripheral device. This allows the peripheral control module 353 to receive an exit signal from the host 122 indicating to cease operating in a standby or power OFF mode and return to the power ON mode 374. As a result, the peripheral device operates in the shutdown mode 376 and then in the power OFF mode 372 when the host 122 transmits a standby mode request signal to the peripheral device.

Figure 10:
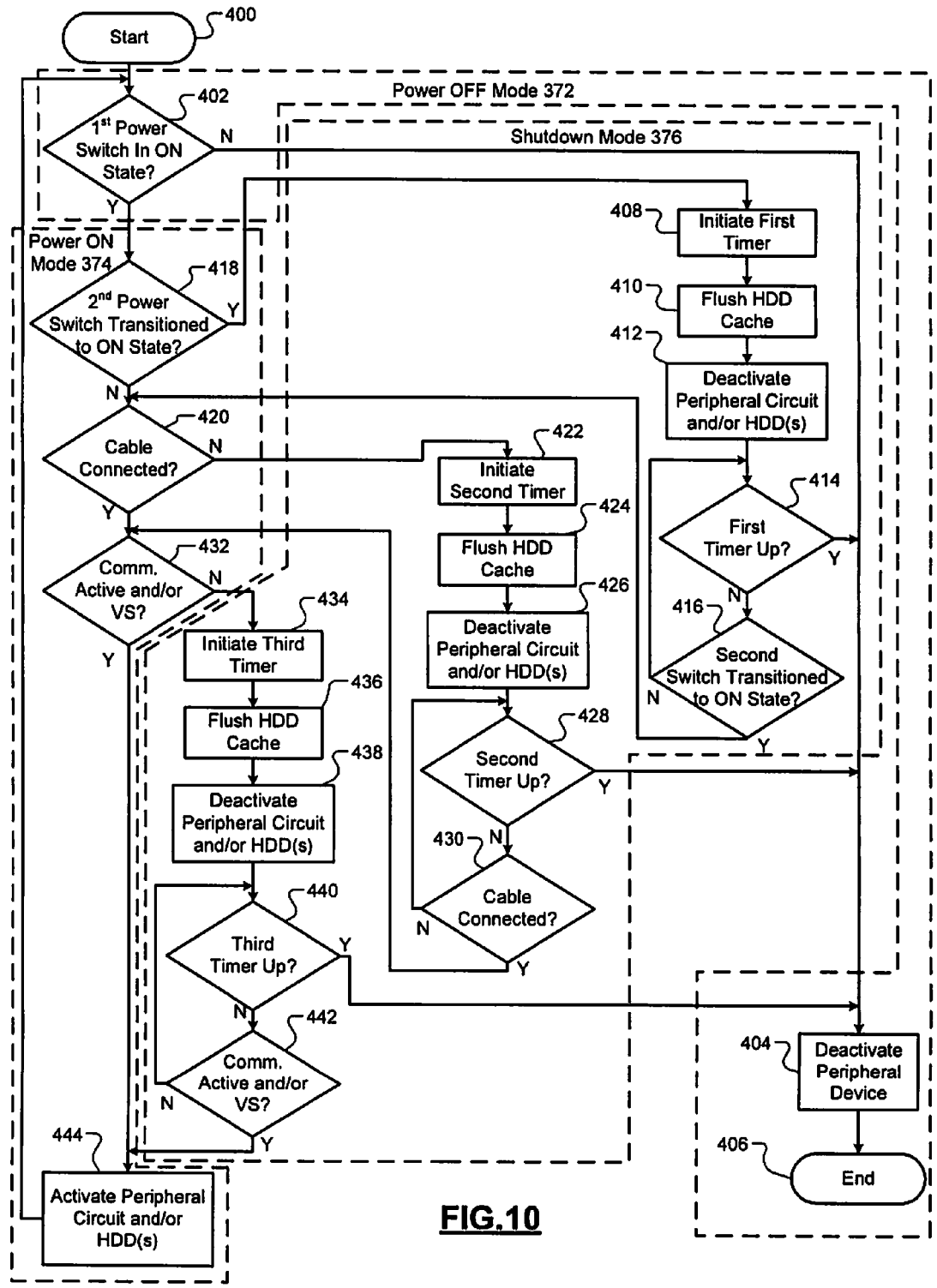
FIG. 10 illustrates a method of operating a peripheral device in accordance with the present disclosure.

The peripheral devices disclosed herein may be operated using numerous methods, an example of a method is provided in FIG. 10. In FIG. 10, a method of operating a peripheral device is shown. Although the following tasks are primarily described with respect to the implementations of FIGS. 7-8, the tasks may be easily modified to apply to other implementations of the present disclosure including the implementations of FIGS. 1-5. The tasks may be iteratively performed. The tasks are grouped and associated with the power OFF mode 372, the power ON mode 374, and the shutdown mode 376 of FIG. 9. The method may begin at 400.

At 402, if a first power switch (e.g., the first power switch 126) is in the CLOSED (or ON) state then task 404 is performed, otherwise task 418 is performed. At 404, the peripheral device is deactivated since there is no power. Power is not supplied from the first power switch to a system switch (e.g., the system switch 128) when the peripheral device is deactivated. Subsequent to task 404, the method may return to step 402 or end at 406, as shown.

At 418, if a second power switch (e.g., the second power switch 132) is pressed or transitioned to the CLOSED (or ON) state, then task 408 is performed, otherwise task 420 is performed. At 408, a first timer (e.g., the first timer 192) is initiated. At 410, volatile memories (e.g., the caches 174, 176 or volatile memory 362) of a peripheral circuit are flushed to respective ones of non-volatile memories (e.g., the rotating storage mediums 178, 179 or the non-volatile memory 364).

The power control module may transmit a shutdown request signal to a circuit control module (e.g., the circuit control module 140 or 366) to flush the volatile memories.

At 412, the power control module transitions a circuit switch to an OPEN (or OFF) state to deactivate the peripheral circuit and/or HDDs of the peripheral circuit. At 414, the power control module determines whether the first timer is up (i.e. the first predetermined period has been exceeded). Task 404 is performed when the timer is up, otherwise task 418 is performed. Task 414 may be performed subsequent to task 416. At 416, if the second power switch is pressed or transitioned back to the CLOSED state, task 420 is performed, otherwise task 414 is repeated.

At 420, if a cable (e.g., the cable 22) is not connected between a host and the peripheral device, then task 422 is performed, otherwise task 432 is performed. The power control module may use one or more techniques to determine whether the cable is connected between the host and the peripheral device. The power control module and/or a connection detection module (e.g., the connection detection module 190) may determine if the cable is connected based on: whether power is received from the host; the connection detection module detects that the cable is connected to the host and the peripheral device; and/or the connection detection module detects communication activity on the cable.

At 422, a second timer (e.g., the second timer 194) is initiated. At 424, the volatile memories are flushed to respective ones of the non-volatile memories. The power control module may transmit a shutdown request signal to a circuit control module to flush the volatile memories.

At 426, the power control module transitions a circuit switch to an OPEN (or OFF) state to deactivate the peripheral circuit and/or HDDs of the peripheral circuit. At 428, the power control module determines whether the second timer is up (i.e. the second predetermined period has been exceeded). Task 404 is performed when the second timer is up, otherwise task 418 is performed. Task 426 may be performed subsequent to task 428. At 430, if the cable is connected, task 432 is performed, otherwise task 428 is repeated.

At 432, if the peripheral device is receiving power from the host and/or there is communication activity between the host and the peripheral device then task 444 is performed. If the peripheral device is not receiving power from the host and/or there is not communication activity between the host and the peripheral device, task 434 is performed. The power control module and/or the connection detection module may monitor the host interface to determine whether power is received from the host and/or whether there is communication activity on the cable, as described above.

At 434, a third timer (e.g., the third timer 196) is initiated. At 436, the volatile memories are flushed to respective ones of the non-volatile memories. The power control module may transmit a shutdown request signal to a circuit control module to flush the volatile memories.

At 438, the power control module transitions a circuit switch to an OPEN (or OFF) state to deactivate the peripheral circuit and/or HDDs of the peripheral circuit. At 440, the power control module determines whether the third timer is up (i.e. the third predetermined period has been exceeded). Task 404 is performed when the third timer is up, otherwise task 442 is performed. Task 438 may be performed subsequent to task 440. At 442, if power is provided from the host to the peripheral device and/or there is communication activity between the host and the peripheral device, task 444 is performed, otherwise task 440 is repeated.

At 444, the peripheral circuit and/or HDDs are activated. This may include the power control module generating the first power enable signal PWR1 and transitioning the circuit switch to the CLOSED state. Power is then provided from a regulator (e.g., the regulator or the second regulator) to the peripheral circuit.

The above-described tasks are meant to be illustrative examples; the tasks may be performed sequentially, synchronously, simultaneously, continuously, during overlapping time periods or in a different order depending upon the application. Also, a state of a device may override states of other devices. For example, if the first power switch is transitioned to the OPEN state during any of tasks 408-444, the tasks 408-444 are interrupted and the peripheral device is deactivated.

The above-described implementations provide deactivation of peripheral devices when not in use (i.e. not being accessed by a host). This can include deactivating a second peripheral device (e.g., a storage drive) downstream from a first peripheral device (e.g., DVD recorder) when the first peripheral device is shut off via a remote control device. This conserves energy and reduces temperatures of the peripheral devices when not in use.

What is claimed is:

1. A peripheral device comprising:
  a host interface configured to receive and transmit data between the peripheral device and a host;
  a power interface configured to receive power from a power source, wherein the power source is separate from the peripheral device and the host;
  a switch having a first state and a second state;
  a control module configured to monitor the host interface and generate a control signal to transition the switch to the second state when the host interface does not receive an expected signal from the host; and
  at least one regulator configured to power the control module and a circuit of the peripheral device based on the power received from the power source, wherein the control module is separate from the circuit,
  wherein the switch is configured to activate the control module, the at least one regulator and the circuit when in the first state and deactivate the control module, the at least one regulator and the circuit when in the second state.

2. The peripheral device of claim 1, wherein the expected signal is:
  a communication signal; or
  a power signal providing an amount of power greater than a predetermined threshold.

3. The peripheral device of claim 1, wherein the switch is configured to deactivate the peripheral device when in the second state.

4. The peripheral device of claim 1, wherein the switch is configured to disconnect the power interface from the control module, the at least one regulator and the circuit.

5. The peripheral device of claim 1, further comprising an alternating current-to-direct current converter configured to convert alternating current received from the power interface to direct current,
  wherein the switch is configured to disconnect the power interface from the alternating current-to-direct current converter.

6. The peripheral device of claim 1, wherein the at least one regulator is configured to power the control module or the circuit of the peripheral device based on the power received from the host.

7. The peripheral device of claim 1, wherein the at least one regulator comprises:

a first regulator configured to power the control module; and a second regulator configured to power the circuit.

8. The peripheral device of claim 1, wherein:
the circuit comprises a hard disk drive, a print mechanism, a projector lamp circuit or a scanner lamp circuit; and
the switch is configured to deactivate the hard disk drive, the print mechanism, the projector lamp circuit or the scanner lamp circuit when in the second state.

9. The peripheral device of claim 1, further comprising:
a storage device for storing the data; and
a second control module configured to control transfer of the data between the host and the storage device,
wherein the switch is configured to deactivate the second control module when in the second state.

10. The peripheral device of claim 9, wherein:
the host interface is a universal serial bus interface;
the second control module is a universal serial bus-to-serial advanced technology attachment converter; and
the storage device includes a hard disk drive.

11. The peripheral device of claim 1, wherein:
the switch is a first switch;
the peripheral device further comprises a second switch configured to transition between a first position and a second position;
the second switch is configured to activate the peripheral device when in the first position and deactivate the peripheral device when in the second position;
the peripheral device is deactivated when the first switch is in the second state and the second switch is in the first position;
the control module transitions from a power ON mode to a shutdown mode and then from the shutdown mode to a power OFF mode when the second switch transitions to the second position; and
the shutdown mode comprises flushing data from a volatile memory to a non-volatile memory.

12. The peripheral device of claim 1, wherein the control module is configured to:
determine whether power is received from the host or there is communication activity between the host and the peripheral device; and
wait a predetermined period prior to deactivating the peripheral device when power is not received from the host or there is no communication activity between the host and the peripheral device.

13. The peripheral device of claim 1, wherein:
the switch is a first switch;
the peripheral device further comprises a second switch configured to activate the peripheral device when in a first position and transition the peripheral device to a shutdown mode when in a second position;
the peripheral device is deactivated and in a power OFF mode when the first switch is in the second state and the second switch is in the first position or the second position; and
the peripheral device is in the power OFF mode when the first switch is in the first state and the second switch is transitioned to the second position.

14. The peripheral device of claim 1, wherein:
the switch is a first switch; and
the peripheral device further comprises a second switch configured to activate the peripheral device when in a first position and transition the peripheral device to a shutdown mode when in a second position, wherein the control module, when the second switch is in the second position, is configured to
initiate a timer,
flush a volatile memory to a non-volatile memory, and
deactivate the circuit.

15. The peripheral device of claim 14, wherein the control module is configured to:
deactivate the peripheral device when a predetermined period of the timer has lapsed; and
refrain from deactivating the peripheral device prior to the predetermined period lapsing and when the second switch is transitioned to the first position.

16. The peripheral device of claim 15, wherein:
the timer is a first timer; and
the control module, when a cable is not connected to the host and to the peripheral device, is configured to
initiate a second timer,
flush the volatile memory to the non-volatile memory, and
deactivate the circuit.

17. The peripheral device of claim 15, wherein:
the timer is a first timer; and
the control module, when power is not received by the peripheral device from the host or there is no communication activity between the host and the peripheral device, is configured to
initiate a second timer,
flush the volatile memory to the non-volatile memory, and
deactivate the circuit.

18. The peripheral device of claim 1, wherein the power interface directly receives the power from the power source and not via the host.

19. A method comprising:
receiving and transmitting data between a peripheral device and a host via a host interface of the host;
receiving power at the peripheral device from a power source, wherein the power source is separate from the peripheral device and the host;
monitoring the host interface;
generating a control signal to transition a switch from a first state to a second state when the host interface does not receive an expected signal from the host;
power a control module and a circuit of the peripheral device via at least one regulator based on the power received from the power source, wherein the control module is separate from the circuit;
activating the control module, the at least one regulator and the circuit via the switch when the switch is in the first state; and
deactivating the control module, the at least one regulator and the circuit via the switch when the switch is in the second state.

20. The method of claim 19, wherein the expected signal is:
a communication signal; or
a power signal providing an amount of power greater than a predetermined threshold.

21. The method of claim 19, wherein the switch is a first switch, and wherein the method further comprises:
activating the peripheral device when a second switch is transitioned from a second position to a first position;
deactivating the peripheral device when the second switch is transitioned from the first position to the second position;
deactivating the peripheral device when the first switch is in the second state and the second switch is in the first position;

transitioning from a power ON mode to a shutdown mode and then from the shutdown mode to a power OFF mode when the second switch transitions to the second position; and during the shutdown mode, flushing data from a volatile memory to a non-volatile memory.

\* \* \* \* \*